Feb. 21, 1933.                    G. R. GOODWIN                    1,898,951
                               FLUID METERING SYSTEM
                                Filed Dec. 7, 1928
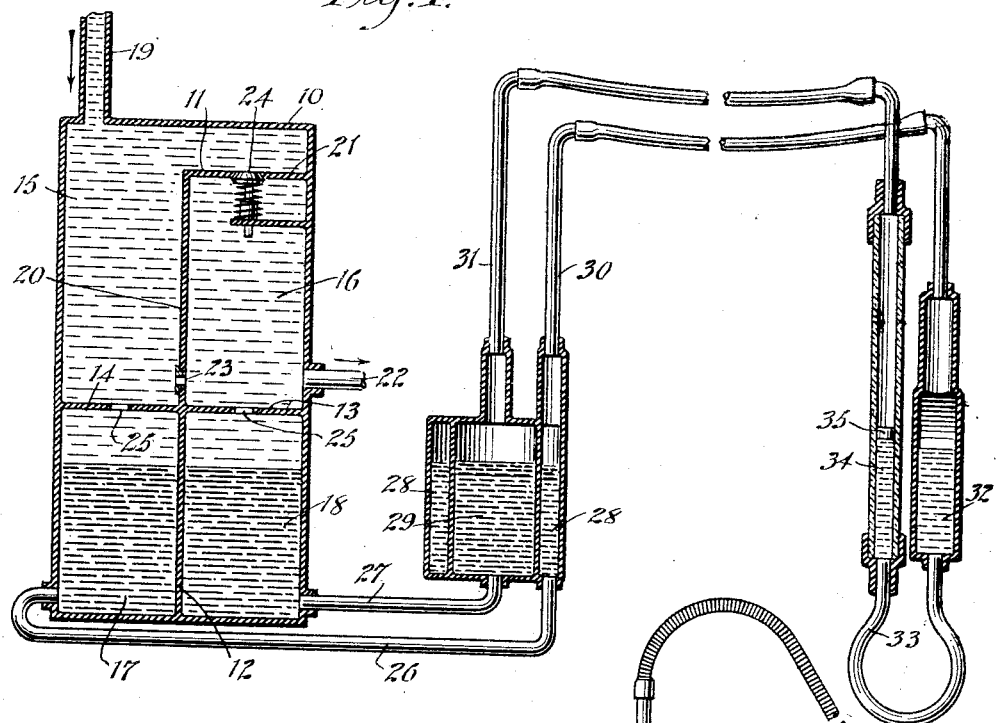
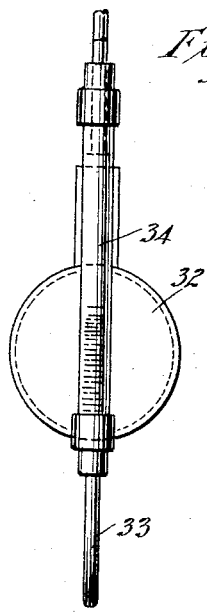
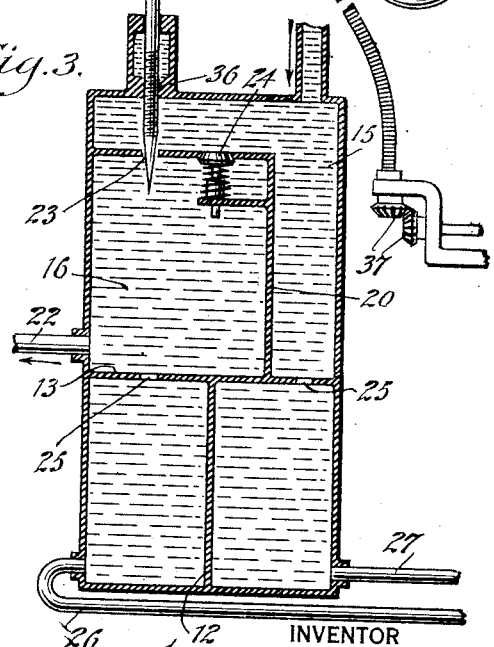
WITNESSES
Edw. Thorpe
A. T. Sperry
INVENTOR
George R. Goodwin
BY Munn & Co.
ATTORNEY Patented Feb. 21, 1933

1,898,951

UNITED STATES PATENT OFFICE

GEORGE R. GOODWIN, OF MELROSE, MASSACHUSETTS

FLUID METERING SYSTEM

Application filed December 7, 1928. Serial No. 324,404.

This invention relates to fluid metering systems.

The device is particularly adapted for use in connection with motor vehicles or the like, in which it is desired to provide a readily readable indicator for determining the relation of fuel consumption with the distance traveled and the speed of travel.

With this object in view, the invention includes the provision of means associated with the fuel line and operable in response to pressure differences therein for controlling the fluid column indicator.

The invention also includes means operable by a speed responsive device for affecting in response to speeds, the fluid indicating column, whereby a variable factor in the reading is provided, so that such reading may be in direct response to both distance of travel and rate of travel.

With these and other objects and features of the invention in view, reference may be had to the accompanying specification and drawing.

It will be appreciated, however, that the specific structural features of the invention herein illustrated and the specific use of the invention herein described, may be readily changed and modified, and the full use of equivalents resorted to without departing from the spirit or scope of the invention.

In the drawing—

Figure 1 is a semi-diagrammatic sectional view of one form of my present invention;

Fig. 2 is a front elevation of the fluid metering column and associated structure;

Fig. 3 is a modified form of the invention, illustrating the speed responsive control thereof.

Referring more particularly to Fig. 1 of the drawing, the invention includes a chamber 10 divided by partitions 11 12, 13 and 14, into sub-chambers 15, 16, 17 and 18. Fluid fuel, such as gasoline, when the device is used in connection with the internal combustion engine of an automobile, is supplied through a supply tube 19, dischargeable into the sub-chamber 15. The partition 11 divides the sub-chamber 15 from the sub-chamber 16. The partition 11 is here illustrated in its preferred embodiment as including a vertical section 20 and a horizontal section 21. Fluid fuel is adapted to pass from the sub-chamber 16 to the carbureter or other supply of the internal combustion engine, through a suitable discharge tube 22. Passage of the fuel from the sub-chamber 15 to the sub-chamber 16 is provided for by an aperture 23 in the vertical section 20 of the partition 11. An aperture and an associated resiliently urged valve 24 are provided in the horizontal portion 21 of the partition 11, whereby upon excessive demands for fuel by the internal combustion engine and the consequent suction through the tube 22, fuel may be supplied through the aperture and associated valve 24.

From the foregoing it will readily be seen that the differences of pressure in the fuel line, are through the aperture 23 concentrated as between the chambers 15 and 16, fluid normally supplied to the engine being passed directly through this aperture.

Associated with the sub-chambers 15 and 16, sub-chambers or actuating chambers 17 and 18 respectively are provided, the sub-chambers being respectively divided by the partitions 14 and 13. Suitable apertures 25 in the partitions 13 and 14 are arranged such that the pressures in the actuating chambers 17 and 18 are in direct response to the pressures in the chambers 15 and 16, which pressures are, as before pointed out, in direct response to the demands for fuel by the consuming unit. Within the lower portion of the sub-chambers 17 and 18, fluid, such as water preferably containing an anti-freeze solution, is provided.

Associated with the lower portions of the sub-chambers 17 and 18, fluid-conducting tubes 26 and 27 are provided, which tubes in turn communicate with concentric chambers 28 and 29, respectively, the concentric arrangement being adapted to prevent inaccuracies due to rocking or tipping of the associated vehicle. Upon the surface of the fluid in the chambers 28 and 29, a fluid, such as oil, is provided to prevent evaporation of the first fluid.

Associated with the upper end of the chambers 28 and 29, fluid-conducting tubes 30 and 31 are provided, the other ends of which are associated with a substantially U-shaped metering device illustrated in detail in Fig. 2. The device includes a chamber 32 of large cross-section associated through a U tube 33 with a vertical transparent calibrated tube 34. The chamber 32, U 33 and tube 34 are partially filled with a suitable indicating fluid of a color whereby the height of the liquid in the tube 34 may be readily detected. The upper end of the chamber 32 and the tube 34 are associated through the tubes 30 and 31, respectively, with the chambers 28 and 29. Thus the rise and fall of the fluid within the chambers 28 and 29, which is in direct response to the rise and fall of the fluid within the sub-chambers 17 and 18, affects the pressure applied to the chamber 32 and tube 34. The larger size of the cross-section of the chamber 32 is adapted to act to permit approximately all the differences of pressure to be read in the tube 34. A suitable indicating float 35 may preferably be provided in the tube 34 and in addition to acting as an indicator, also enables an observer to read a flat surface rather than a meniscus. The upper ends of the chambers 29 and 28 are provided with tubes of increased diameter associated with the tubes 30 and 31. An extension of increased diameter is also associated with the chamber 32. This construction of the device provides for the return of liquids within the chambers, which through vibration of the device have been splashed upon the walls of the chambers.

In the operation of this form of the invention, it will be readily seen that upon demands for fuel by the engine, the pressure in the sub-chamber 16 decreases and fuel passes from the sub-chamber 15 through the aperture 23 to the sub-chamber 16, the differences of pressure of the whole fuel-feeding system being contralized and in proportion with the differences of pressure in the sub-chambers 15 and 16. The differences of pressure in these chambers similarly affect the differences of pressure in the sub-chambers 17 and 18, through the provision of the apertures 25 and thus the height of the oil or other liquid in the chambers 17 and 18 corresponds to the differences of pressure in the sub-chambers 15 and 16. The differences in height of fluid in the sub-chambers 17 and 18 affect the corresponding differences in height of this fluid in the concentric chambers 28 and 29.

It will be seen that the respective rise and fall of the fluids within the concentric chambers vary the pressure upon the indicating fluid in the U indicator, through the provision of the tubes 30 and 31, and thus the height of the indicating float 35 will be in direct response to the differences of pressure in the fuel-feeding system, whereby the consumption of fuel by the consuming unit may be readily determined by the float 35. It will readily be seen that this construction provides for a thorough air seal throughout the device.

In that form of the invention illustrated in Fig. 3, the construction and operation is substantially the same as that form of the invention illustrated in Fig. 1. The aperture 23 is, however, adjustable, the adjustment being provided for by the use of a needle valve 36, which is actuated in response to a speedometer or other speed responsive device, the connection being illustrated by the gears 37. With this construction, it will be readily seen that the co-ordination of the size of the orifice 23 with the speed of the vehicle is effected, and as the gas consumption of a motor varies with the speed of the vehicle, and as the demands for fuel as measured by the suction of the motor vary over widely varying ranges of speed of the vehicle, the needle valve 36 automatically compensates for such variations and through the use of this modified form of the invention, the metering tube 34 may be directly calibrated in miles per gallon and the comparison of the fuel consumption with the rate of speed as is necessary in that form of the invention illustrated in Fig. 1, is avoided.

From the foregoing it may readily be seen that the present invention provides a simple, economical, practical and highly efficient structure designed to readily advise a motor operator of the fuel consumption characteristics of his vehicle.

As before pointed out it will also be readily seen that the invention is not confined to the specific structural embodiment herein disclosed and that numerous changes and modifications and the full use of equivalents may be resorted to without departing from the spirit or scope of the invention.

What is claimed is:

1. A fluid metering system including a casing having an inlet at the top, a divisional wall cross-shaped in cross section dividing the interior of the casing into a supply chamber, a discharge chamber, a first actuating chamber, and a second actuating chamber, said divisional wall being provided with apertures positioned so that the first actuating chamber will be in free communication with the supply chamber, the secondary actuating chamber will be in free communication with the discharge chamber, and the discharge chamber will be in free communication with the supply chamber, said discharge chamber having an outlet whereby when fluid is flowing through said outlet there will be a difference in pressure between the supply chamber and the discharge chamber, and a difference of pressure between the respective actuating chambers and the supply and discharge chambers, a pressure responsive indicator, tubular means for connecting the second actuating chamber to the indicator, tubular means for connecting the first actuating chamber to the indicator so that the pressure conveyed by the first named tubular means will oppose the pressure conveyed by the second named tubular means, and means interposed in both of said tubular members for presenting expansion chambers.

2. A fluid metering system including a casing having an inlet at the top, a horizontal divisional wall extending from one side of the casing to the other, a vertical divisional wall arranged substantially centrally and extending from the bottom to near the top, said last mentioned wall having a right angular extension extending to the sides of the casing whereby the casing is divided into a supply chamber in communication with said inlet, a discharge chamber having an outlet, a first actuating chamber below the supply chamber, and a secondary actuating chamber below the discharge chamber, there being an aperture in the first mentioned wall between the respective actuating chambers and the chambers immediately thereabove, said vertical wall having an aperture for providing communication between the supply chamber and the discharge chamber, said angular extension having an aperture, a spring pressed valve for normally closing said last mentioned aperture, a tubular pressure responsive indicator, a tubular structure extending from the first actuating chamber to the tubular indicator, and a tubular member extending from the secondary actuating chamber to said tubular indicator so that the pressure conveyed by said tubular structure will oppose the pressure conveyed by said tubular member.

3. A fluid metering system including a supply chamber, means forming an inlet for said supply chamber, a discharge chamber, an apertured wall dividing said chambers, means forming an outlet for said discharge chamber whereby the flow of fluid through said outlet will cause a difference of pressure between said chambers, a pressure response indicator, and means for actuating said indicator in response to pressure differences of said chamber, said means including an actuating chamber for each of the two first mentioned chambers, an apertured wall dividing the first two chambers from the respective actuating chambers, a pair of concentric chambers, a tubular member connecting the interior of the lower portions of one of said actuating chambers with the interior of the lower portions of one of said concentric chambers, a second tubular member connecting the interior of the lower portions of the other actuating chamber with the interior of the lower portions of the remaining concentric chamber, a communicating tube connecting one of concentric chambers with said indicator, and a tubular structure connecting the other of said concentric chambers to said indicator.

4. A fluid metering system including a casing provided with four divisional walls dividing the casing into a supply chamber, a discharge chamber and a pair of actuating chambers, the flow of fluid out of said discharge chamber causing a pressure difference between said supply and discharge chambers and between the actuating chambers and the supply and discharge chambers, the wall between the supply chamber and the discharge chamber and the respective walls between the supply and discharge chambers and the actuating chambers being apertured to permit the flow of fluid from one chamber to the other, a pressure response indicator and means for actuating said indicator in response to pressure differences of said supply and discharge chambers, said means including a fluid circuit for said indicator and including said actuating chambers, said actuating chambers being connected respectively to said supply and discharge chambers and not with each other whereby pressure differences of the supply and discharge chambers will be communicated to said actuating chambers and tubes extending from said actuating chambers to said indicator for transmitting fluid from the actuating chambers in response to pressure differences.

GEORGE R. GOODWIN.